United States Patent
Carpino, II (10) Patent No.: US 11,999,493 B2
(45) Date of Patent: Jun. 4, 2024

(54) METHOD AND SYSTEM FOR ICE SHED

(71) Applicant: Goodrich Corporation, Charlotte, NC (US)

(72) Inventor: Richard J Carpino, II, Canton, OH (US)

(73) Assignee: Goodrich Corporation, Charlotte, NC (US)

( * ) Notice: Subject to any disclaimer, the term of this patent is extended or adjusted under 35 U.S.C. 154(b) by 516 days.

(21) Appl. No.: 17/219,504

(22) Filed: Mar. 31, 2021

(65) Prior Publication Data

US 2022/0315228 A1    Oct. 6, 2022

(51) Int. Cl.
| | |
|---|---|
| *B64C 15/14* | (2006.01) |
| *B64D 15/14* | (2006.01) |
| *H05B 1/02* | (2006.01) |
| *H05B 3/00* | (2006.01) |
| *B64C 29/00* | (2006.01) |

(52) U.S. Cl.
CPC .......... *B64D 15/14* (2013.01); *H05B 1/0236* (2013.01); *H05B 3/0014* (2013.01); *B64C 29/0033* (2013.01); *H05B 2203/005* (2013.01)

(58) Field of Classification Search
CPC ...... B64D 15/12; B64D 15/14; H05B 1/0236; H05B 3/0014; H05B 2203/005
See application file for complete search history.

(56) References Cited

U.S. PATENT DOCUMENTS

| | | | |
|---|---|---|---|
| 3,002,718 A | 10/1961 | Hackenberger | |
| 3,013,752 A * | 12/1961 | Rush | B64D 15/12 219/549 |
| 3,657,514 A | 4/1972 | Adams | |
| 4,021,008 A | 5/1977 | Eichenauer | |
| 5,351,918 A * | 10/1994 | Giamati | B64D 15/12 244/134 R |

(Continued)

FOREIGN PATENT DOCUMENTS

| | | |
|---|---|---|
| EP | 0040017 B1 | 7/1984 |
| EP | 0680878 B1 | 12/1999 |

(Continued)

OTHER PUBLICATIONS

Extended Search Report in European Application No. 22164080.8 dated Aug. 2, 2022, 10 pages.

(Continued)

*Primary Examiner* — Christopher D Hutchens
(74) *Attorney, Agent, or Firm* — Suiter Swantz IP (57) ABSTRACT

During a de-ice process, heating zones associated with a rotor may be supplied with power for shedding accreted ice from the heating zone. Priority heating zones associated with the leading edge of the rotor are supplied with power to activate the priority heating zones multiple times during the de-ice process. Heating zones associated with a lower surface of the rotor may be activated after the priority heating zones are first activated. A first dwell may be waited, to allow additional ice accretion on the priority zones. The priority heating zones may then be reactivated after the first dwell. Heating zones associated with an upper surface of the rotor may be then be activated. A second dwell may be waited, to allow additional ice accretion on the priority zones. The de-ice process may then repeat.

10 Claims, 7 Drawing Sheets

(56) References Cited

U.S. PATENT DOCUMENTS

| | | | |
|---|---|---|---|
| 6,129,314 A * | 10/2000 | Giamati | B64D 15/163 244/134 A |
| 6,279,856 B1 * | 8/2001 | Rutherford | B64D 15/14 244/134 R |
| 6,851,929 B2 | 2/2005 | Goldberg | |
| 8,628,042 B2 | 1/2014 | Imbert et al. | |
| 8,827,207 B2 | 9/2014 | Mullen et al. | |
| 9,499,273 B2 | 11/2016 | Beaven | |
| 9,745,070 B2 | 8/2017 | Brouwers et al. | |
| 10,457,403 B2 | 10/2019 | Houlihan et al. | |
| 10,710,732 B2 | 7/2020 | Aubert et al. | |
| 2007/0075188 A1 * | 4/2007 | Stoner | F01D 25/02 244/134 D |
| 2007/0194179 A1 * | 8/2007 | Giamati | B64D 15/14 244/134 D |
| 2008/0156937 A1 * | 7/2008 | Hindel | B64D 15/12 244/134 D |
| 2009/0149997 A1 * | 6/2009 | Stothers | B64D 15/12 700/275 |
| 2014/0219798 A1 * | 8/2014 | Beaven | B64D 15/12 416/1 |
| 2015/0023792 A1 | 1/2015 | Spitzner et al. | |
| 2019/0084682 A1 | 3/2019 | Aubert et al. | |
| 2019/0176994 A1 | 6/2019 | Burton et al. | |
| 2020/0391874 A1 | 12/2020 | Garnett et al. | |
| 2021/0300573 A1 * | 9/2021 | Danielson | B64D 15/12 |

FOREIGN PATENT DOCUMENTS

| | | |
|---|---|---|
| EP | 1871665 B1 | 3/2017 |
| GB | 1516879 A | 7/1978 |

OTHER PUBLICATIONS

European Examination Report dated Feb. 5, 2024; European Application No. 22164080.8.

* cited by examiner

METHOD AND SYSTEM FOR ICE SHED

BACKGROUND

It may be desirable to have relatively uniform ice accretion between a leading edge, a lower surface, and an upper surface of a rotor. In this regard, ice having a larger thickness may be easier to shed, while also not exceeding a maximum ice thickness. For tilt rotor applications, an ability to limit a size of ice shed from the rotor is critical because the shed ice can impact an aircraft fuselage. Anti-ice apparatuses, such as anti-ice parting strips applied to a leading edge of the rotor, must be continuously powered to eliminate ice accretion in the area of highest collection. Thus, a power system of the tilt rotor aircraft must be able to supply power to the anti-ice parting strip continuously. Therefore, it would be advantageous to provide a device, system, or method that cures the shortcomings described above.

SUMMARY

A de-icing system is disclosed, in accordance with one or more embodiments of the present disclosure. In one illustrative embodiment, the system includes a controller coupled with a power system. In another illustrative embodiment, the controller includes a processor and a memory. In another illustrative embodiment, the processor is configured to execute program instructions maintained on the memory causing the controller to provide power from the power system to activate a plurality of span-wise heating zones for an on-time. In another illustrative embodiment, the plurality of span-wise heating zones are activated in a shed sequence. In another illustrative embodiment, the shed sequence includes providing power to a heating zone associated with a leading edge of a rotor more frequently than at least one heating zone associated with an upper surface of the rotor or at least one heating zone associated with a lower surface of the rotor.

A method of de-icing a rotor by supplying power to activate a plurality of span-wise heating zones associated with a rotor in a shed sequence is disclosed, in accordance with one or more embodiments of the present disclosure. In one illustrative embodiment, the method includes activating at least one heating zone associated with a leading edge of a rotor. In another illustrative embodiment, the method includes activating at least one heating zone associated with a lower surface or an upper surface of the rotor. In another illustrative embodiment, the method includes reactivating the at least one heating zone associated with the leading edge of the rotor. In another illustrative embodiment, the method includes activating at least one additional heating zone associated with the lower surface or the upper surface of the rotor.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. A rotor may be used in a variety of applications, such as, fixed-wing airplane applications (propeller), helicopter applications (rotor blade), tilt rotor applications (tilt rotor blade), or wind turbine applications (turbine blade). Such rotor may include one or more regions which may be susceptible for collecting ice. For example, the regions of the rotor may include a leading-edge, a lower surface, an upper surface, and a trailing edge.

A rotor de-icing system is described. The rotor de-icing system may include de-icing elements. By the de-icing elements, an airfoil (e.g., a rotor) may be shed of ice. In this regard, the de-icing elements may include any suitable elements for de-icing, such as, but not limited to, a heating element. Where the de-icing element is a heating element, the heating element may include any suitable heating element, such as, but not limited to, an electrothermal heating element. The electrothermal heating element may include one or more heating coils configured to raise a temperature of the rotor based on a supplied electrical power. The electrothermal heating element may include a spanwise heating element including a plurality of heating zones, as will be described further herein.

A Rotor Ice Protection Systems and Methods is disclosed in U.S. patent application Ser. No. 16/684,104, Publication No. 2020/0391874, by Harold Edward Garnett et al, which is incorporated herein by reference in its entirety.

Figure 1:
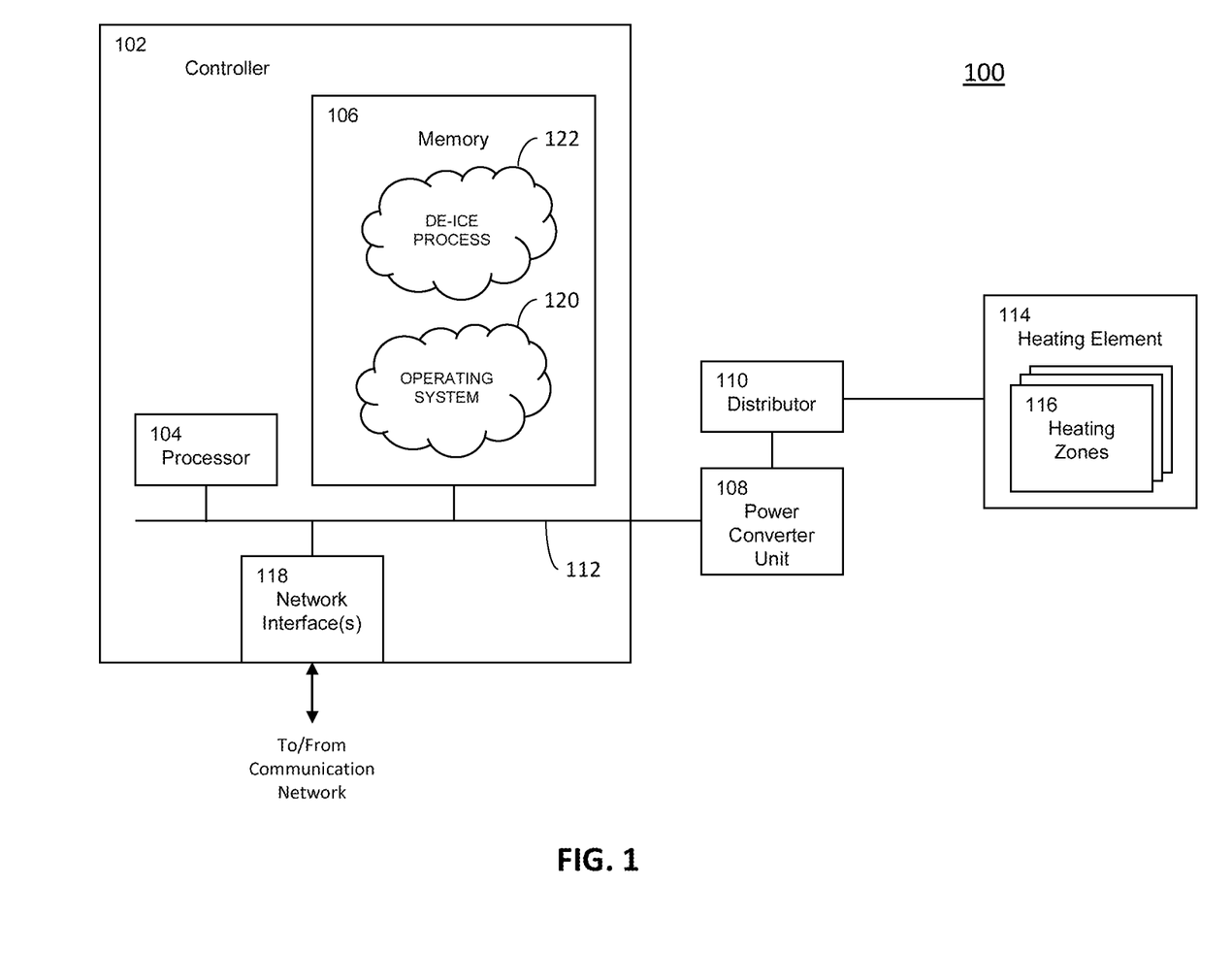
FIG. 1 depicts a schematic diagram of an ice-shed system, in accordance with one or more embodiments of the present disclosure.

Referring now to FIG. 1, a de-icing system 100 is described. The de-icing system 100 may be configured to de-ice a rotor (see FIG. 2, rotor 204). The system 100 may include one or more controllers 102, including a processor 104 and a memory 106. The controller 102 may receive power from a power system (not depicted) by a connection (e.g., a wireline connection). The power system may include a power generator, such as, but not limited to, an alternating current generator (e.g., single phase, three phase) or a direct current generator.

The system 100 may further include one or more power converter units 108. The controller 102 may be in communication with the power converter unit 108 (e.g., communication of power from the power system). The system 100 may further include one or more distributors 110. The power converter unit 108 may further communicate, via a communication bus 112, with the distributor 110. The system 100 may further include one or more heating elements 114 associated with the rotor. The distributor 110 may further communicate with the heating element 114 associated with the rotor. The processor 104, memory 106, and a network interface 118 of the controller 102 may be coupled by the communication bus 112. The communication bus 112 may further couple the controller 102 with the power converter unit 108. Thus, the controller 102 may communicate to the power converter unit 108 and subsequently to the distributor 110, such that the distributor 110 may provide power (e.g., direct current rectified power) to the one or more heating zones 116 of the heating element 114.

The heating element 114 may include multiple heating zones 116. The heating zones 116 may be associated with regions of the rotor (e.g., the leading-edge, the lower surface, or the upper surface). A heating zone may be considered to be associated with a region of a rotor by being disposed on the region of the rotor. For example, the heating element 114 may include from three to ten of the heating zones 116, with at least some of the heating zones associated with the leading-edge, the lower surface, or the upper surface. One of the heating zones 116 may be energized or provided power at a time. By providing power to one of the heating zones 116 at a time, a total power required by the heating element 114 at an instant of time may be reduced. This may be desirable in reducing an instantaneous power requirement of the power system.

During a shed sequence (e.g., a de-ice cycle), the controller 102 may command the distributor 110 to energize each heating zone 116 in a sequence. The sequence may cause ice in contact with the heating zone 116 to at least partially melt and be shed from the rotor. The ON time for each heating zone 116 during the de-ice process 122 may be substantially equal. The ON time may be selected based on a temperature required to shed ice from a portion of the rotor associated with the heating zone 116. If the icing condition persists, additional ice may accumulate and the de-ice process 122 may continue. In embodiments, the de-ice process 122 may repeat the shed sequence cyclically. In embodiments, the controller 102 is configured to adjust a next shed sequence based on input signals, such as, but not limited to, an outside air temperature (OAT), a liquid water content (LWC), an airspeed, a rotor rotations per minute (RPM), or an axis angle of attack of the rotor. For example, various portions of the next shed sequence may be adjusted based on the input signals, such as, but not limited to, the ON time, one or more dwell periods, or a frequency of activating the heating zones, as will be described further herein.

The controller 102 may include one or more network interfaces 118. The network interface 118 may include any suitable network interface for interfacing with a communication network (e.g., a communication network of an aircraft), such as, but not limited to, a wired or a wireless network interface. The network interface 118 may include mechanical, electrical, or signaling circuitry for communicating data to and from an aircraft communication network (e.g., Common Avionics Architecture System (CAAS)) and subsequently to various other sensors, components, and aircraft systems. The controller may be configured to receive various input signals from the network interface 118, such as, but not limited to, angle of a rotor, a liquid water content, or an outside air temperature.

The processor 104 may include hardware elements or hardware logic adapted to execute one or more software programs maintained on the memory 106. The memory 106 may include one or more storage locations that are addressable by the processor 104 and the network interface 118 for storing the software programs and data structures. The memory 106 may include an operating system 120. The operating system 120 may functionally organize the device by invoking operations in support of software processes and/or services. The memory may further include a de-ice process 122. The de-ice process 122 may include computer executable instructions which are configured to be executed by the processor 104, to provide control signals to cause one or more heating elements to perform de-ice functionality (e.g., by selectively providing power to activate the heating zones 116 in a shed sequence). The techniques described herein may be performed by hardware, software, and/or firmware, such as in accordance with processes 122, or a combination thereof, which may contain computer executable instructions executed by the processor 104 (or independent processor of interfaces 118). In addition, while process 122 is shown as installed in the memory 106, and therefore being implemented in software, these processes could be implemented in any of hardware (e.g., electronic circuitry), firmware, software, or a combination thereof. Alternatively, these processes may be configured on a storage medium for subsequent loading into memory 106. The storage medium can include a computer-readable medium encoded with a computer program, and can be any conventional storage medium that stores the processes thereon in tangible form. Examples of storage media include a floppy disk, a compact disk, a magnetic tape, a read only memory, an optical storage media, universal serial bus (USB) flash drive, etc. Alternatively, storage media can include a random-access memory, or other type of electronic storage, located on a remote storage system and coupled to processor 104, via network interface 118. As will be apparent to those skilled in the art other processor and memory types, including various computer-readable media, may be used to store and execute program instructions pertaining to the techniques described herein. Further, while the processes have been shown separately, those skilled in the art will appreciate that processes may be routines or modules within other processes.

The controller 102 may receive ice conditions from one or more sensors (e.g., by way of the network interface 118). The ice conditions may include various data from an icing rate sensor (e.g., a magneto-strictive sensing element). The data regarding the ice conditions may include a rate of ice accretion on the rotor. The ice condition may also include a liquid water content (LWC) of the air and/or an outside air temperature (OAT). The controller 102 may further monitor the ice condition of the rotor over time. Based on the ice condition (e.g., the rate of ice accretion on the rotor, the liquid water content of the air, the outside air temperature, etc.), the controller may select a shed sequence for the heating zones 116 of the heating element 114 and provide the de-icing signal to the distributor, for transmitting power to the appropriate heating zone 116 of the heating element 114. The shed sequence may repeat until an icing condition is no longer present.

Each heating zone of the rotor may accrete a layer of ice with a thickness during a shed sequence. Some heating zones 116 may accrete more ice during a given time, as compared to other heating zones 116. To ensure ice-shed with a minimal power requirement, it may be desirable for a minimum thickness of ice to accrete on each heating zone 116, before the heating zone 116 is provided with power. In this regard, ice with the minimum thickness may be shed while requiring a reduced power (e.g., due to the centrifugal force of the ice mass assisting in shedding the ice when a layer of the ice touching the heating zone has melted). It may also be desirable for a maximum thickness of ice to accrete on each heating zone 116 (e.g., $3/16$th of an inch) before ice shed. In this regard, ice with a large thickness may damage surrounding aircraft structure such as the fuselage.

The sequence in which the heating zones 116 are energized may be selected such that one or more of the heating zones associated with a high collection efficiency portion (e.g., a leading edge, adjacent to the leading edge) of the rotor are activated more frequently than other heating zones, per shed sequence. It is contemplated that the de-ice system 100 may include from one to three high collection efficiency zones. De-icing the leading edge more frequently per shed sequence may be advantageous, because the leading edge of the rotor (or the zones adjacent to the leading edge) may accrete more ice than the lower surface or the upper surface. By de-icing the leading edge more frequently per shed sequence, the rotor may not require an anti-ice strip. Similarly, de-icing the lower surface more frequently than the upper surface may be advantageous, depending upon a tilt-angle of the rotor (e.g., the upper surface may have a much lower collection efficiency in a transition mode). Thus, the controller 102 may be configured to select the de-ice process 122 to accommodate for a collection efficiency of the rotor.

Figure 2:
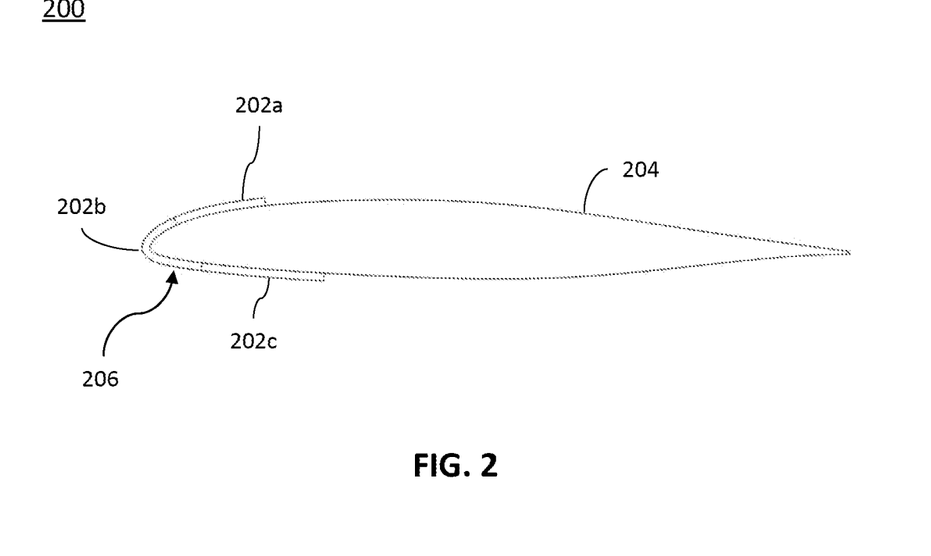
FIG. 2 depicts a cross-section of a three-zone heating element associated with a rotor, in accordance with one or more embodiments of the present disclosure.

Referring now to FIG. 2, a system 200 is described, in accordance with one or more embodiments of the present disclosure. The system 200 may be identical to the system 100 with the exception that a heating element 206 of the system 200 includes three heating zones. For example, a heating zone 202a associated with an upper surface of the rotor 204, a heating zone 202b associated with the leading edge of the rotor 204, and a heating zone 202c associated with the lower surface of the rotor 204. As may be understood, the system 200 is not intended to be limited to the specific shape of the rotor 204.

Figure 3A:
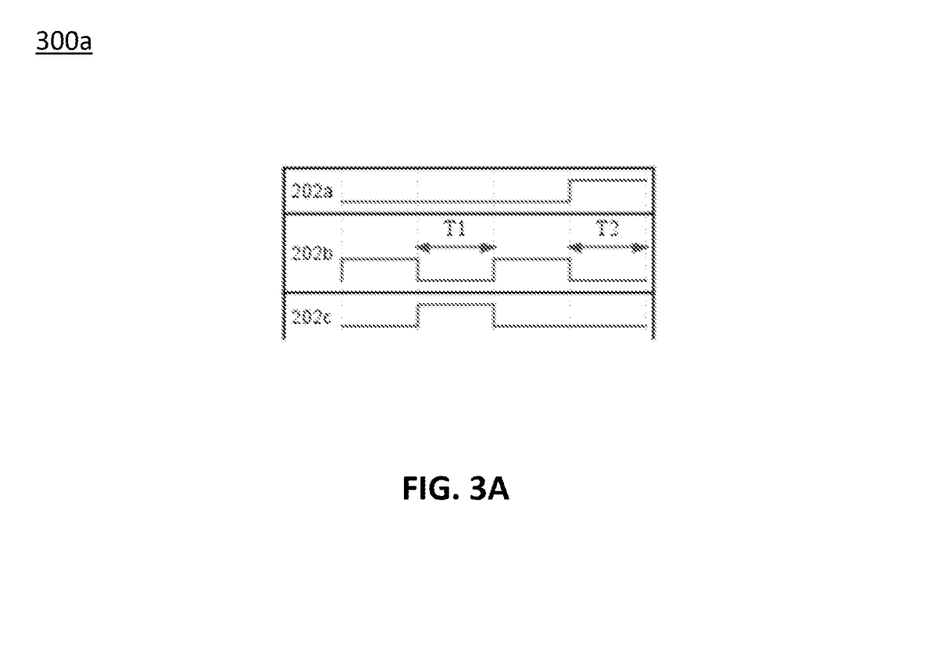
FIGS. 3A-3C depict a timing diagram of a de-ice process for a three-zone heating element, in accordance with one or more embodiments of the present disclosure.

Referring now to FIG. 3A, a timing diagram 300a of the de-ice process 122 for the system 200 is described, in accordance with one or more embodiments of the present disclosure.

In embodiments, a frequency of activating the heating zones during the de-ice process 122 may include activating the heating zone 202b associated with the leading edge two times, activating the heating zone 202c associated with the lower surface one time, and activating the heating zone 202a associated with the upper surface one time. For example, the heating zone 202b associated with the leading edge may be activated, then the heating zone 202c associated with the lower surface may be activated, then the heating zone 202b associated with the leading edge may be reactivated, then the heating zone 202a associated with the upper surface may be activated.

In embodiments, the controller 102 is configured to control a period of time between activating the high accretion heating zones (e.g., the heating zone 202b associated with the leading edge). For example, the period may be controlled such that the leading edge may accrete a substantially similar thickness of ice before shedding. Where the heating zone 202b associated with the leading edge is activated with a frequency of two times per shed sequence 122, a time (T1) between activating and reactivating the heating zone 202b associated with the leading edge may be substantially equal to a time (T2) between reactivating and activating the heating zone 202b associated with the leading edge in a next shed sequence. In this regard, where the time (T1) and the time (T2) are substantially equal, a thickness of ice accreted on the heating zone 202b may be similar each time the heating zone 202b is activated. This may be advantageous in uniformly accounting for ice shed at the leading edge during and between shed sequences of the de-ice process 122. The de-ice process 122 may then be repeated until an icing condition is no longer present.

Figure 3B:
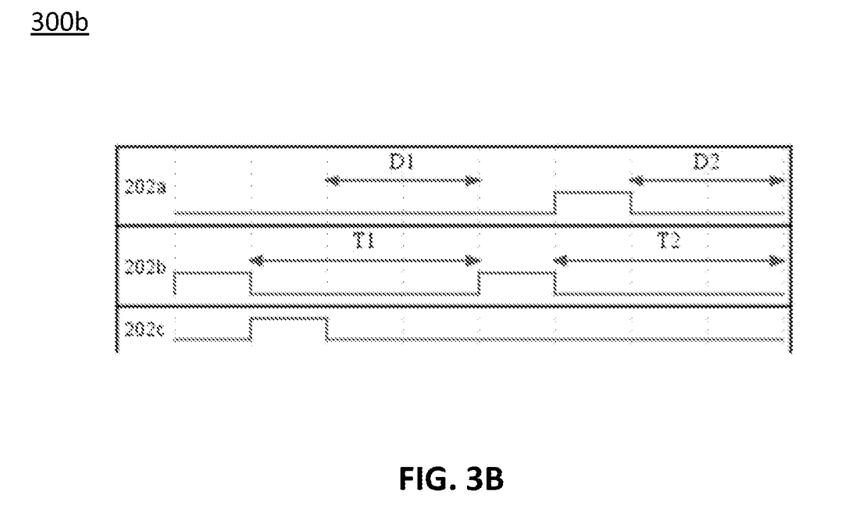

Referring now to FIG. 3B, a timing diagram 300b of the de-ice process 122 for the system 200 is described, in accordance with one or more embodiments of the present disclosure.

In embodiments, the controller 102 may be configured to adjust a shed sequence based on an input signal. The adjustment to the shed sequence may include adjusting for high or low accretion scenarios. To accommodate for the low accretion scenarios (e.g., due to a low liquid water content or a high outside air temperature), a time between the leading edge de-ice shed may be increased. In embodiments, the controller 102 is configured to accommodate for low icing conditions (e.g., based on the liquid water content or the outside air temperature) by adding one or more dwells to the de-ice process 122. By the one or more dwells, a minimum ice thickness may be allowed to accrete. During the dwell, no power may be provided to the heating zones. A total dwell time of the de-ice process 122 may be defined as a total shed sequence period minus a sum of each of the zone "ON" times. The total dwell time may be divided into one or more portions, such as a first dwell (D1) and a second dwell (D2). In embodiments, the first dwell and the second dwell are an equal amount of time. In other embodiments, the first dwell time and the second dwell time may be selected such that a time between shedding a leading edge is substantially equal. Thus, the de-ice process 122 may be adjusted by adding or reducing the dwell depending upon the icing conditions. In this regard, the distributor 110 may continuously provide power during severe icing conditions and may intermittently provide power during low icing conditions.

Figure 3C:
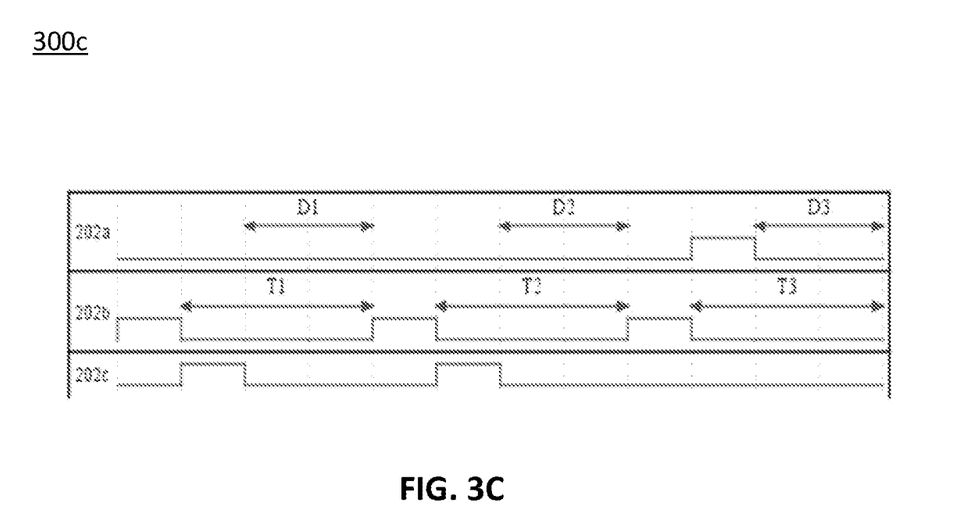

Referring now to FIG. 3C, a timing diagram 300c of the de-ice process 122 of the system 200 is described, in accordance with one or more embodiments of the present disclosure.

In embodiments, the controller 102 is configured to adjust a shed sequence based on an input signal. The adjustment to the shed sequence may include adjusting a frequency of activating the heating zones 202a-202c. For example, the heating zones 202b and 202c may be determined to accrete more ice than the heating zones 202a when an axis angle of rotation of the rotor changes (e.g., to a transition mode) or when the rotor is experiencing high icing conditions (e.g., based on the liquid water content or the outside air temperature). The frequency may be adjusted to include activating the heating zone 202b associated with the leading edge three times, activating the heating zone 202c associated with the lower surface two times, and activating the heating zones 202a associated with the upper surface one time per de-ice process. In this regard, the heating zone 202c associated with the lower surface may be activated more frequently than the heating zone 202a associated with the upper surface. In embodiments, the controller 102 is configured to control a period of time between activating the high accretion heating zones (e.g., T1, T2, and T3) after adjusting a frequency of activating the heating zones 202a-202c. For example, although FIG. 3C depicts adjusting the frequency, as applied to a three-heating zone system 200, this is not intended to be a limitation on the present disclosure. Where additional heating zones are included, the period may be controlled by adjusting the dwells (e.g., dwell (D1), dwell (D2), and dwell (D3). Similarly, the controller 102 may control the period of time between activating the high accretion heating zones and/or accommodate for various icing conditions for more than three heating zones.

Figure 4:
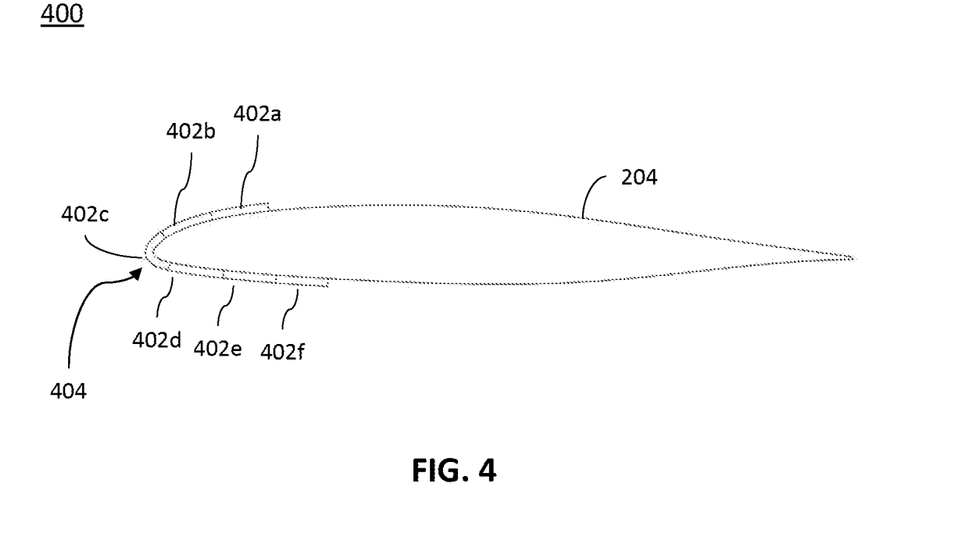
FIG. 4 depicts a cross-section of a six-zone heating element associated with a rotor, in accordance with one or more embodiments of the present disclosure.
Figure 5:
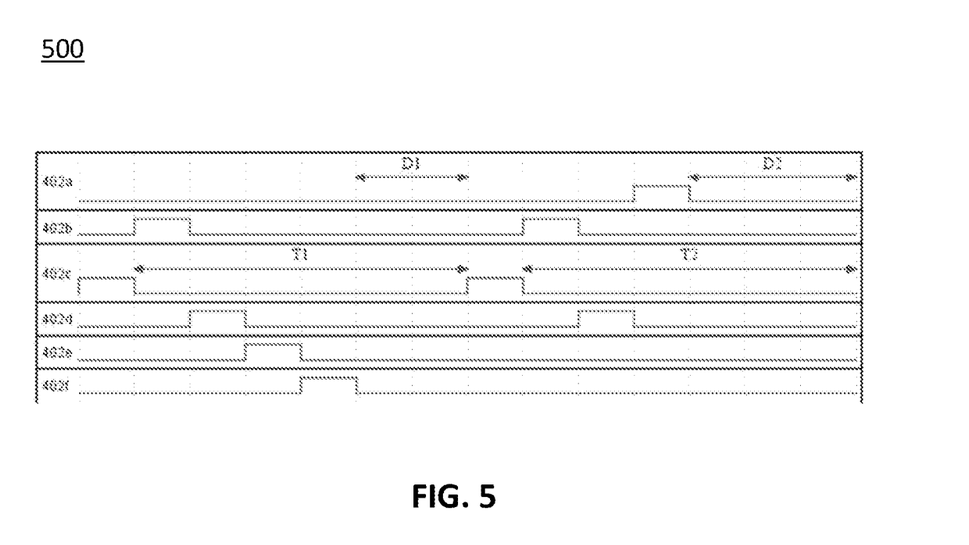
FIG. 5 depicts a timing diagram of a de-ice process for a six-zone heating element, in accordance with one or more embodiments of the present disclosure.

Referring now to FIG. 4, a system 400 is described, in accordance with one or more embodiments of the present disclosure. The system 400 may be identical to the system 100 with the exception that a heating element 404 of the system 400 includes six heating zones. For example, heating zones 402a-402b may be associated with the upper surface of the rotor 204, heating zone 402c may be associated with the leading edge of the rotor 204, and heating zones 402d-402f may be associated with the lower surface of the rotor 204. Referring now to FIG. 5, a timing diagram 500 of the de-ice process 122 for the system 400 is depicted, in accordance with one or more embodiments of the present disclosure. As depicted, the heating zones 402b and the heating zones 402d may be adjacent to the heating zones 402c associated with the leading edge. Such heating zones 402b, 402c, 402d may be considered priority heating zones, which are activated more frequently than one or more of the heating zones associated with upper surface (e.g., heating zone 402a) or the lower surface (e.g., heating zones 402e, 402f). The controller 102 may also be configured to control the period between activating the heating zone 402c, such that the first time T1 and the second time T2 are substantially equal. Depending upon the icing conditions, the controller 102 may further be configured to add a first dwell D1 and a second dwell D2 (e.g., in low icing conditions).

Figure 6:
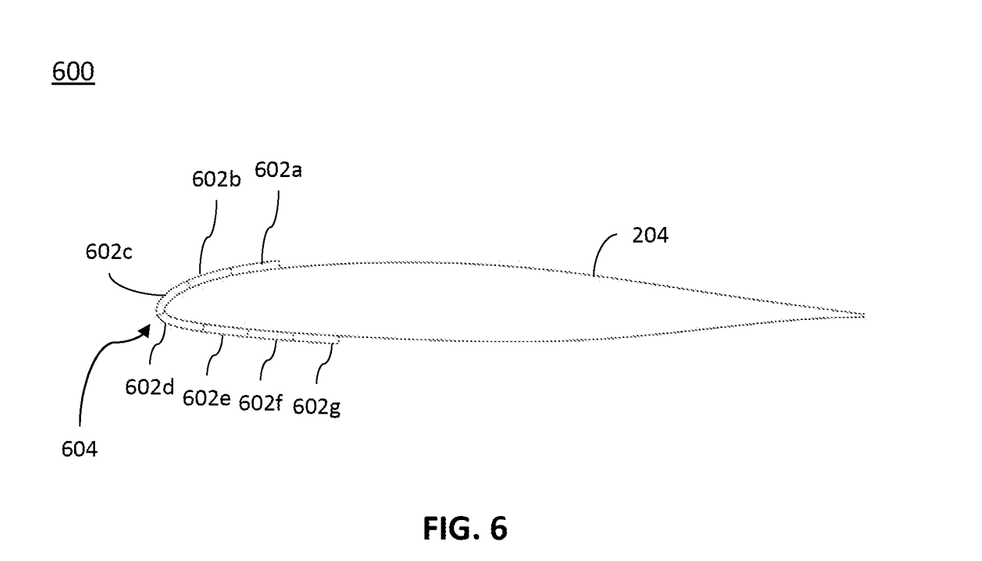
FIG. 6 depicts a cross-section of a seven-zone heating element associated with a rotor, in accordance with one or more embodiments of the present disclosure.
Figure 7:
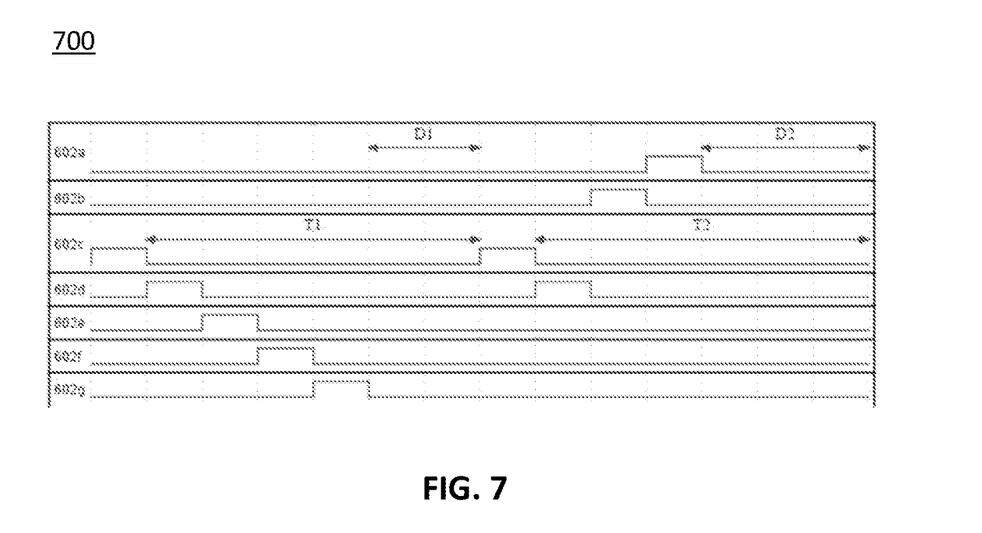
FIG. 7 depicts a timing diagram of a de-ice process for a seven-zone heating element, in accordance with one or more embodiments of the present disclosure.

Referring now to FIG. 6, a system 600 is described, in accordance with one or more embodiments of the present disclosure. The system 600 may be identical to the system 100 with the exception that a heating element 604 of the system 600 includes seven heating zones. For example, heating zones 602a-602b associated with the upper surface of the rotor 204, heating zones 602c-602d associated with the leading edge of the rotor 204, and heating zones 602e-602g associated with the lower surface of the rotor 204. Although much of the present disclosure has described a single heating zone as being associated with the leading edge, this is not intended as a limitation on the present disclosure. In this regard, two heating zones (e.g., heating zones 602c-602d) may split the leading edge. Referring now to FIG. 7, a timing diagram 700 of the de-ice process 122 for the system 600 is described. An exemplary shed sequence is described for the seven heating zones 602a-602f. The ON time for the heating zones 602a-602f may be nine seconds. An OFF time for the de-ice process 122 may be two hundred and ninety seconds. Heating zones 602c and 602d may be considered priority zones (e.g., based on an associated with the leading edge of the rotor 204). A number of shed zones activated during the de-ice process 122 may be equal to nine (e.g., seven zones plus two priority zones). A total dwell time may be equal to [OFF time]−[number of shed zones−1]*ON time, or two hundred and eighteen seconds. A time between leading edge zone shed may then be equal to [Number of ON Times between Leading Edge Zone*ON time]+D1, for D1=D2, or one hundred and forty-five seconds. In this example, the time between leading edge zone shed is half the OFF time. The time between leading edge zone shed may be dependent upon the number of zones, the number of priority zones, the OFF time, and the ON time.

Figure 8:
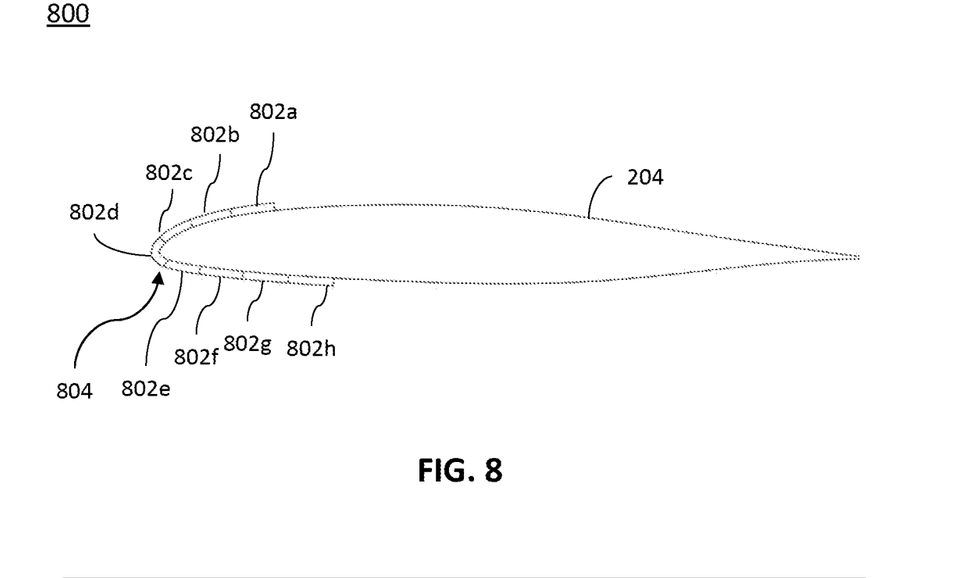
FIG. 8 depicts a cross-section of an eight-zone heating element associated with a rotor, in accordance with one or more embodiments of the present disclosure.
Figure 9:
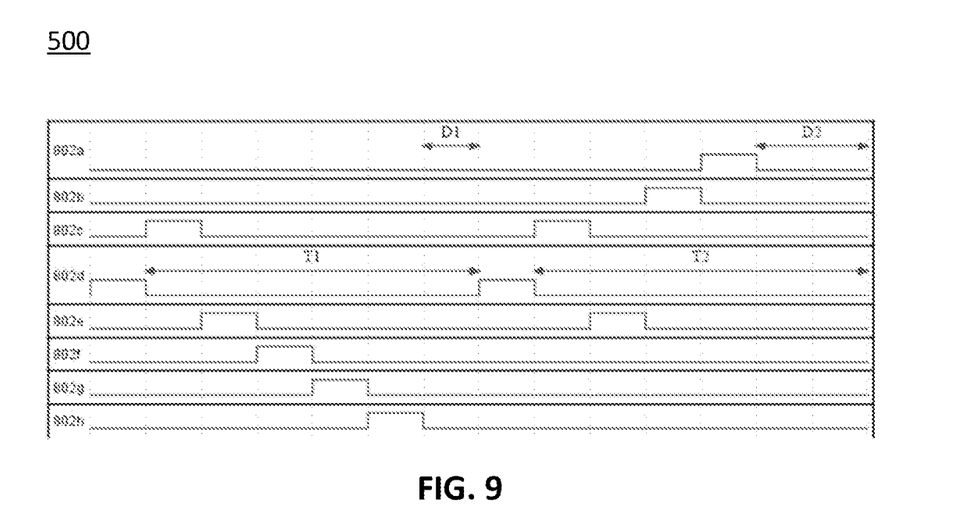
FIG. 9 depicts a timing diagram of a de-ice process for an eight-zone heating element, in accordance with one or more embodiments of the present disclosure.

Referring now to FIG. 8, a system 800 is described, in accordance with one or more embodiments of the present disclosure. The system 800 may be identical to the system 100 with the exception that the system 800 includes a heating element 804 including eight heating zones. For example, heating zones 802a-802c may be associated with the upper surface of the rotor 204, heating zone 802d may be associated with the leading edge of the rotor 204, and heating zones 802e-802h may be associated with the lower surface of the rotor 204. Referring now to FIG. 9, a timing diagram 900 of the de-ice process 122 for the system 800 is depicted, in accordance with one or more embodiments of the present disclosure.

Figure 10:
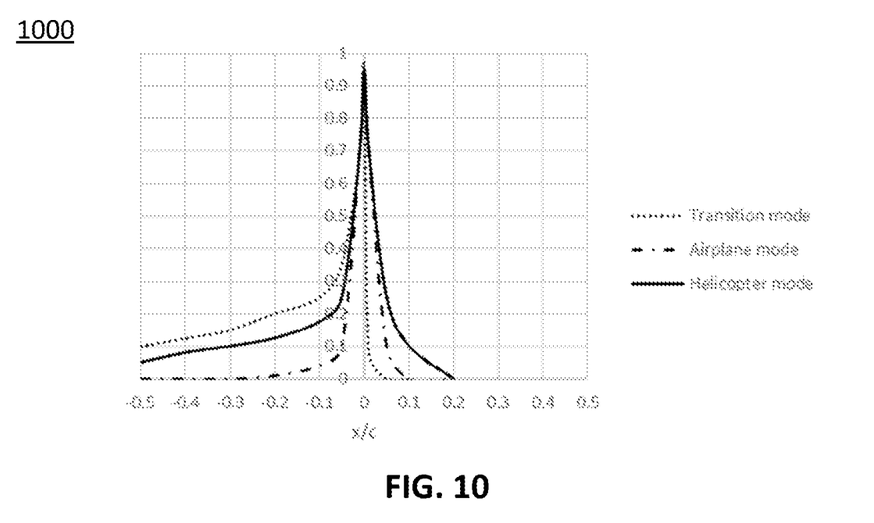
FIG. 10 depicts a collection efficiency graph of a tilt rotor aircraft, in accordance with one or more embodiments of the present disclosure.

Referring now to FIG. 10, a collection efficiency graph 1000 of a tilt rotor aircraft is described, in accordance with one or more embodiments of the present disclosure. Rotor blades (e.g., rotor 204) may include a collection efficiency curve. The collection efficiency curve may indicate a collection efficiency of ice on the rotor surface as a function of a position from a leading edge of the rotor surface (x/c). The collection efficiency of the rotor surface is highest near the leading edge. Tilt rotor blades may also include a collection efficiency curve which is dependent upon a configuration of the tilt rotor blades.

An application of the de-ice system 100 may be for a tilt rotor aircraft. Such tilt rotor aircraft may include one or more modes based on a tilt angle of the rotor axis of rotation, such as, but not limited to, an airplane mode, a transition mode, and a helicopter mode. The axis of rotation angle of the rotor may be adjustable between a range of suitable values, such as, but not limited to, between zero (e.g., the airplane mode) and ninety degrees (e.g., the helicopter mode). In embodiments, the aircraft may be considered in a transition mode when the rotor includes an axis angle of rotation from thirty to seventy-five degrees.

Depending on the mode in which the tilt rotor is currently configured, the tilt rotor may accrete ice at varying rates. The tilt rotor may generally accrete the most amount of ice at a leading edge (as depicted at zero x/c), with diminishing accretion from the leading edge along the lower surface, and diminishing accretion from the leading edge along the upper surface, regardless of the current mode. For example, the collection efficiency may drop off to a value of less than half of a peak collection efficiency between 3 to 5 percent chord (x/c of between 0.03 to 0.05). As may be understood, the numerical values provided are not intended to be limiting. In this regard, the collection efficiency as a function of chord may be dependent upon various factors, such as, but not limited to, the design of the tilt rotor blade, tilt angle of the rotor axis of rotation, an outside air temperature, a rotational velocity of the tilt rotor blade, a speed of the aircraft, or a liquid water content of the air.

The controller 102 is configured to receive a signal from the communication network (e.g., by way of the network interface 118), the signal indicative of a current mode of the aircraft or an axis of rotation angle of the rotor. The de-ice process 122 may then be configured to selectively adjust which heating zones 116 of the heating element 114 are provided power and adjust the first dwell (D1) and the second dwell (D2). For example, the controller 102 may receive a signal indicating that the tilt rotor is in a transition mode. When the tilt rotor is configured in the transition mode, the accretion of ice may drop to near zero from the leading edge along the upper surface. To accommodate the reduced accretion of ice, the controller 102 may increase a frequency in which heating zones associated with the leading edge and the lower surface are activated.

Although much of the present disclosure is contemplated in regards to tilt rotor aircraft applications, this is not intended as a limitation on the present disclosure. In embodiments, the de-icing system 100 may be used on a variety of applications, such as, but not limited to, a rotary aircraft (e.g., a dual rotor shaft aircraft, tilt rotor aircraft, etc.), a fixed wing aircraft, or a wind turbine.

Figure 11:
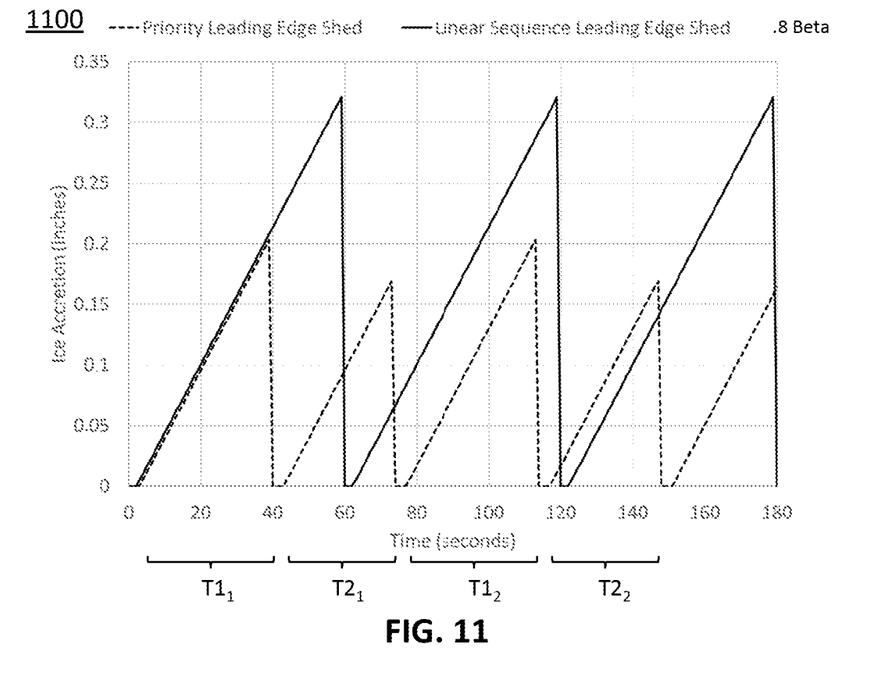
FIG. 11 depicts an ice accretion graph, in accordance with one or more embodiments of the present disclosure.

Referring now to FIG. 11, an ice accretion graph 1100 is depicted, in accordance with one or more embodiments of the present disclosure.

The ice accretion graph 1100 depicts a priority leading edge shed by the de-ice process 122 at one or more priority heating zones. The ice accretion graph 1100 also depicts a linear sequence leading edge shed (e.g., activated sequentially with each heating zone activated once per sequence). Because the de-ice process 122 may accrete and shed ice from the leading-edge multiple times during the de-ice process 122, the de-ice process 122 may be configured to include a longer shed sequence period, under similar icing conditions while remaining below a maximum ice thickness, as compared to the linear sequence. Furthermore, the de-ice process 122 may accrete more ice on the upper surface and the lower surface before shedding (not depicted), under similar icing conditions, as compared to the linear sequence, because of the longer shed sequence period. With proper zone sizing based on collection efficiency, the ice accretion limit on the upper and lower surfaces can be roughly equal to the ice accretion limit of the leading edge. This allows for less upper and lower surface heater power since more ice is accreting between de-ice processes which increases the centrifugal force of the ice.

The first time T1 and the second time T2 has been described as being substantially equal. As depicted, time $T1_1$ between activating a priority heating zone of and reactivating the priority heating zone may be within five seconds of time $T2_1$ of reactivating the priority heating zone and activating the priority heating zone in a next shed sequence of the de-ice process 122. This may be similar across shed sequences (e.g., first time $T1_2$ and second time $T2_2$).

Because the first time T1 is depicted as being slightly longer than the second time T2, the ice shed after the first time T1 (e.g., approximately 0.2 inches) is greater than the ice shed after the second time T2 (e.g., approximately 0.175 inches). Where a difference between the first time T1 and the second time T2 approaches zero, a difference in ice shed after the first time T1 and the second time T2 may similarly approach zero. This may be desirable in shedding ice with a uniform thickness at the leading edge across the shed sequence.

What is claimed:
1. A de-icing system comprising:
  a rotor, wherein the rotor is configurable between an airplane mode, a transition mode, and a helicopter mode;
  a plurality of span-wise heating zones; and
  a controller coupled with a power system, the controller including a processor and a memory, the processor configured to execute program instructions maintained on the memory causing the controller to provide power from the power system to activate the plurality of span-wise heating zones for an on-time, the plurality of span-wise heating zones including a heating zone associated with a leading edge of the rotor, at least one heating zone associated with an upper surface of the rotor, and at least one heating zone associated with a lower surface of the rotor, the plurality of span-wise heating zones activated in a shed sequence, wherein the shed sequence includes providing power to the heating zone associated with the leading edge of the rotor more frequently than the at least one heating zone associated with the upper surface of the rotor and the at least one heating zone associated with the lower surface of the rotor;
  wherein the controller is configured to adjust the shed sequence based on an input signal from a network interface, wherein the input signal comprises a current mode of the rotor, wherein the current mode is one of the airplane mode, the transition mode, and the helicopter mode;

wherein the controller is configured to increase a frequency in which the heating zone associated with the leading edge of the rotor and the at least one heating zone associated with the lower surface of the rotor are activated when the rotor is configured in the transition mode.

2. The de-icing system of claim 1, wherein the controller is configured to control a period between activating the heating zone associated with the leading edge such that the leading edge may accrete a substantially similar thickness of ice before shedding.

3. The de-icing system of claim 1, wherein the input signal is at least one of a liquid water content of air or an outside air temperature.

4. The de-icing system of claim 3, wherein the controller is configured to add one or more dwells to the shed sequence based on the liquid water content or the outside air temperature, wherein no power is provided to the plurality of span-wise heating zones during the one or more dwells.

5. The de-icing system of claim 3, wherein the controller is configured to repeat the shed sequence until an icing condition is no longer present, the icing condition based on the liquid water content of air or the outside air temperature.

6. The de-icing system of claim 1, wherein the input signal is indicative of an axis angle of rotation of the rotor.

7. The de-icing system of claim 6, wherein the controller is configured to adjust the shed sequence based on the axis angle of rotation, wherein adjusting the shed sequence based on the axis angle of rotation comprises providing power to the at least one heating zone associated with the lower surface of the rotor more frequently than the at least one heating zone associated with the upper surface of the rotor.

8. The de-icing system of claim 1, wherein the plurality of span-wise heating zones are part of an electrothermal heating element.

9. The de-icing system of claim 8, wherein the plurality of span-wise heating zones comprises from three to ten span-wise heating zones.

10. The de-icing system of claim 1, wherein the controller is configured to adjust a frequency of activating the heating zone associated with the leading edge.

* * * * *